Nov. 6, 1923.                                           1,473,469
                       C. CYNAMON
                      AUTOMOBILE LOCK
                  Original Filed Nov. 25, 1921
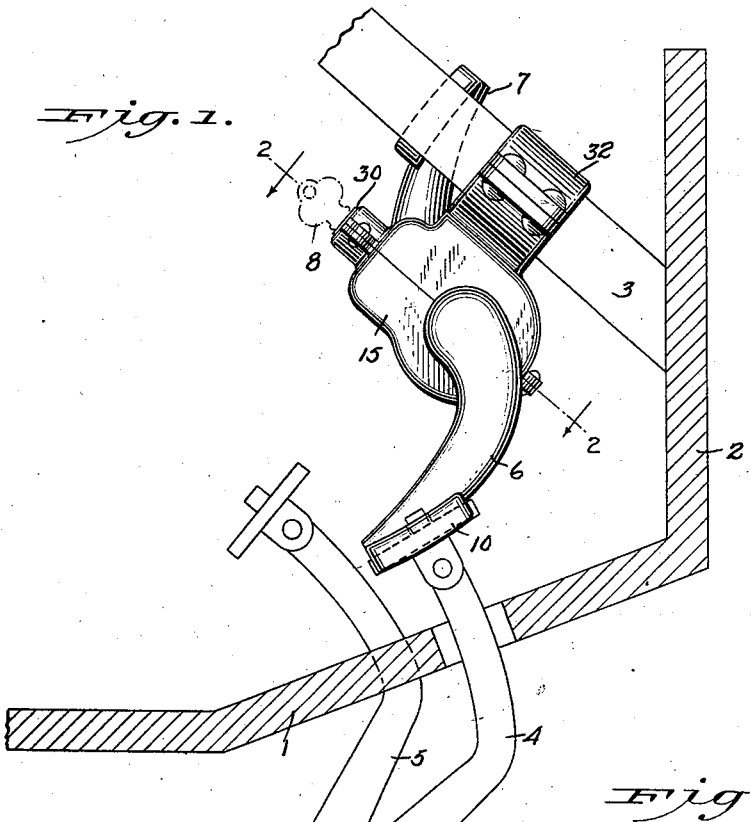
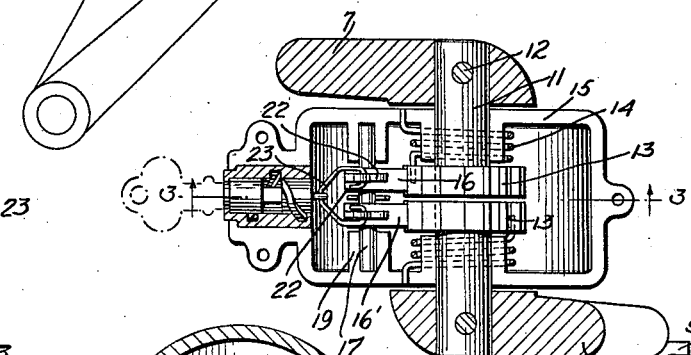
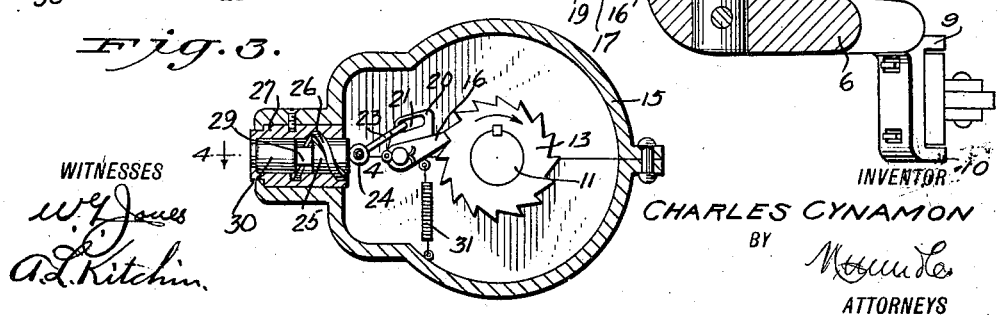
WITNESSES                                    INVENTOR
                                        CHARLES CYNAMON
                                              BY
                                                ATTORNEYS Patented Nov. 6, 1923.

1,473,469

UNITED STATES PATENT OFFICE.

CHARLES CYNAMON, OF NEW YORK, N. Y.

AUTOMOBILE LOCK.

Application filed November 25, 1921, Serial No. 517,610. Renewed September 19, 1923.

*To all whom it may concern:*

Be it known that I, CHARLES CYNAMON, a citizen of the United States, and a resident of the city of New York, borough of the Bronx, in the county of Bronx and State of New York, have invented a new and Improved Automobile Lock, of which the following is a full, clear, and exact description.

This invention relates to automobile locks and has for an object to provide an improved construction for so locking the automobile as to prevent theft to a large extent while being capable of complying with the usual laws now in force in different States.

Another object of the invention is to provide a theft lock for automobiles which will hold the control pedals in an inoperative position.

A still further object is to provide a theft lock for automobiles which may be moved to an operated position by the foot and act to hold the clutch out and the brake in.

In the accompanying drawing—

Figure 1 is a side view of the lock disclosing one embodiment of the invention, said lock being shown applied.

Figure 2 is a sectional view through Figure 1 approximately on line 2—2.

Figure 3 is a sectional view through Figure 2 on line 3—3.

Figure 4 is a detail fragmentary sectional view through Figure 3 on line 4—4.

Referring to the accompanying drawing by numerals, 1 indicates the flooring of an automobile and 2 the dashboard. The automobile is provided with the usual steering post 3 and with the usual pedals 4 and 5 for controlling the clutch and the brake. When these pedals are pushed forwardly or down, the brake is applied and the clutch is thrown out. This construction is old and well known and forms no part of the present invention. However, these parts co-act with the lock shown in Figure 1 through the action of the arms 6 and 7 which arms are adapted to be moved downwardly by the foot against the pedals 4 and 5 and then downwardly with the pedals until their extreme set position is attained.

For instance, if the pedal 4 is operating the clutch, then the showing in Figure 1 would indicate that the clutch is locked in a disconnected or unclutched position while the brake is released. In case it should be desired to lock the brake in an operated or braking position, arm 7 would be swung down until it engages the pedal 5 and then the arm and pedal would be pushed downwardly until the full or desired braking action has been secured. When the arms 6 and 7 have been pushed down by the feet or by other means to the desired position, they will remain in that position until the lock has been unlocked by a suitable key 8. Each of the arms is provided with overhanging shoulders 9 and 10 whereby there is a form of foot provided which straddles the pedals and prevents any unauthorized disengagement of the pedals from the arms. These arms are of identical construction and also the parts associated therewith are of the same construction so that a description of one will apply to both.

As shown in Figures 2 and 3, arm 7 is rigidly secured to a shaft 11 by a rivet or other securing means 12 though if desired this shaft could be made integral with arm 7. A ratchet wheel 13 is keyed or otherwise rigidly secured to shaft 11 and is continually urged in one direction by a spring 14, which spring has one end connected to the ratchet wheel and the other to the casing 15. This connection usually consists in providing apertures in these members and inserting the ends of the spring. This spring is intended to throw the arm back to the position shown in Figure 1 when the ratchet wheel 13 is released from its locking pawl 16. The pawl 16 is pivotally mounted on a shaft 17, which shaft extends from the boss or enlargement 18 into the boss or enlargement 19 so that one shaft may act as a journal member for pawls 16 and 16'. Pawl 16 is provided with an upstanding ear or lug 20 having a slot 21 into which the hook end 22 of the link 23 extends. Link 23 is pivotally mounted on eye 24 rigidly secured to or formed integral with the sliding block 25, which sliding block is provided with a cam or steep thread 26. This cam or steep thread is fitted into a suitable groove in the shell 27 rigidly secured in any suitable manner to casing 15. The block 25 is provided with a square or polygonal-shaped bore 28 in which a square projection 29 extends, said projection being connected with the rotatable part of lock 30. The lock 30 may be a pin lock or any other suitable lock which is operated by a key and which requires the lock to be moved to a locked position before the key can be removed.

When arm 6 is arranged as shown in Figure 1 or in case both arms are in a locked position and it is desired to unlock the same, key 8 is inserted into lock 30 and rotated in a proper direction for causing the block 25 to move toward the lock 30. The movement of this block is sufficient to pull on the link 23 and lug or ear 20 so as to raise the pawls 16 and 16' out of engagement with their respective ratchet wheels 13. As soon as the pawls have been disengaged from the ratchet wheels, the springs 14 will quickly throw the arms back to an inoperative position as indicated in respect to arm 7 in Figure 1. Whenever the key 8 is used, both of the arms are unlocked but when the arms are moved to a locked position either arm may be moved independently to a locked position or both arms may be moved simultaneously to a locked position.

In applying the brake, the brake pedal does not always move in the same position and, consequently, one fixed position would not be sufficient to properly lock the brake in a braking position. The provision of the ratchet wheel 13 and pawls takes care of this contingency and permits the brake pedal to be pushed down as far as desired. The pawl 16 will merely slip over the ratchet wheel until the ratchet wheel finaly comes to a rest. In order to insure proper engagement of the pawls with the ratchet wheels, the spring 31 is provided for each of the pawls 16 and 16'.

The casing 15 may be made in two parts as shown or more parts as desired and may be secured to the steering post 3 or other part of the automobile. As shown in Figure 1, a suitable encircling clamping structure 32 is provided which is preferably riveted so that it will not become dislodged accidentally nor will it permit easy removal by an unauthorized person.

What I claim is:—

1. A theft lock for automobiles comprising a pair of oppositely disposed locking arms adapted to engage certain operating parts of an automobile for holding the same against movement, means for locking said arms in a given position, springs for returning said arms to an inoperative position, and a key operated mechanism for disengaging the means for locking the arms whereby said arms may be quickly moved by said springs to an inoperative position.

2. A theft preventive lock for automobiles comprising a casing, means for rigidly securing said casing to the steering post of the automobile, a pair of pivotally mounted and oppositely disposed arms having portions extending into the casing, said arms being adapted to engage the brake pedal and clutch pedal, means for locking said arms when in engagement with said brake and clutch pedals so as to prevent the operation of said pedals, and a key operated mechanism for unlocking said arms, together with spring means for quickly returning said arms to their unlocked position when said key operates said mechanism.

3. A theft lock of the character described comprising a casing, means for rigidly securing the casing to the steering post of an automobile, a pair of locking arms having projections extending into the casing, said arms being adapted to engage the depressed arm and the brake and clutch pedals of the automobile when moved to a locked position, means for automatically locking said arms as they are swung to a locked position, said means including a pair of locking pawls, and a key operated mechanism for moving said locking pawls to a disengaged position whereby said arms may be swung to an inoperative position.

4. A theft lock for automobiles comprising a casing, means for securing the casing to the automobile, a pair of pivotally mounted arms having portions projecting into the casing, a ratchet carried by each of the projections, a pawl for locking said ratchet against return movement whereby said arms are locked against return movement regardless of the position thereof, and key operated means for moving said pawls to an inoperative or disengaged position.

5. A theft lock for automobiles comprising a casing, means for rigidly securing the casing to an automobile, a pair of swinging arms, a shaft for each of said arms extending into said casing, a ratchet wheel rigidly secured to each of said shafts, a pawl for each of said ratchet wheels for locking the ratchet wheels and arms against a return movement regardless of the position of the arms, and a key operated mechanism for moving said pawls out of engagement with said ratchet wheels.

6. A theft lock for automobiles comprising a pair of arms, a shaft secured to each of said arms, means for supporting said arms and shaft and connecting the same to an automobile, a ratchet wheel rigidly secured to each of said shafts, spring members acting on said shafts to resiliently hold the arms in a given position, spring pressed pawls engaging said ratchet wheels for preventing a reverse rotation of said arms, and key operated mechanism connected with said pawls for moving the pawls out of engagement with the ratchet wheels when the key operated mechanism has been moved to an unlocked position.

CHARLES CYNAMON.